(12) United States Patent
Morgan

(10) Patent No.: US 8,458,452 B1
(45) Date of Patent: Jun. 4, 2013

(54) SYSTEM AND METHOD FOR ENCRYPTION AND DECRYPTION OF DATA TRANSFERRED BETWEEN COMPUTER SYSTEMS

(76) Inventor: James P. Morgan, West Lebanon, NH (US)

( * ) Notice: Subject to any disclaimer, the term of this patent is extended or adjusted under 35 U.S.C. 154(b) by 257 days.

(21) Appl. No.: 12/910,172

(22) Filed: Oct. 22, 2010

Related U.S. Application Data

(60) Provisional application No. 61/255,069, filed on Oct. 26, 2009.

(51) Int. Cl.
*H04L 29/06* (2006.01)

(52) U.S. Cl.
USPC .......................................................... 713/150

(58) Field of Classification Search
None
See application file for complete search history.

(56) References Cited

U.S. PATENT DOCUMENTS 8,041,335 B2 * 10/2011 Khetawat et al. .......... 455/404.2
2006/0080732 A1 * 4/2006 Ohkubo et al. ................... 726/9

* cited by examiner

*Primary Examiner* — Brandon Hoffman
(74) *Attorney, Agent, or Firm* — Loginov & Associates, PLLC; William A. Loginov

(57) ABSTRACT

This invention overcomes the disadvantages of the prior art by providing a system and method for cryptographic communication that allows for the use of identical random number database structures located on the sending and receiving clients to randomly encode and decode messages based on encoded instructions on how to apply the database to encode and subsequently decode the underlying encoded message data, allowing for a secure and keyless transfer of message data between the sender and the recipient. Illustratively, an encoded message on a sending client with an appended header containing the filename, a unique synchronization block and instruction set with the method and starting point is encoded again to obscure the header. The message is transmitted and received by a receiving client and decoded, first by trial and error on the header portion to reveal the header, and then the remaining message data according to the revealed instruction set.

11 Claims, 4 Drawing Sheets

SYSTEM AND METHOD FOR ENCRYPTION AND DECRYPTION OF DATA TRANSFERRED BETWEEN COMPUTER SYSTEMS

RELATED APPLICATION

This application claims the benefit of U.S. Provisional Application Ser. No. 61/255,069, filed Oct. 26, 2009, entitled SYSTEM AND METHOD FOR ENCRYPTION AND DECRYPTION OF DATA TRANSFERRED BETWEEN COMPUTER SYSTEMS, the entire disclosure of which is herein incorporated by reference.

FIELD OF THE INVENTION

This invention relates to data encryption and decryption systems and methods, and more particularly to such systems and methods for use with data transferred between an encoding site and a decoding site

BACKGROUND OF THE INVENTION

Cryptographic communication is a science with roots in the distant past. It is an invaluable medium for protecting private information from unauthorized access. The earliest forms of cryptography employed cipher pads in the possession of a sender and receiver. The pads allowed the sender to encode a readable set of characters into a seemingly random sequence of characters that would only be properly decoded by the receiver after applying the same cipher. More recently, cryptographic devices mechanized the cipher function, allowing for the sender and receiver's applicable cipher to be varied based upon a shared key code that could be changed at will.

As the Internet and other computer-based networks have become a ubiquitous and preferred medium for the transfer of personal, business and governmental information, the concern over the security of that information has increased exponentially. In general, unencrypted data transmitted over a network is fundamentally insecure and readily accessible by a wide range of unauthorized interlopers. Most modern encryption processes employed in the transfer of data over computer networks are based upon a key system.

Highly secure cryptographic systems may employ a one-time pad, which is possessed by the sender and the receiver. The pad is defined by a data source containing a sequence of random transformations between an unencrypted character and an encrypted character. An encryption algorithm for the sender indexes through the pad, transforming each character from a regular to an encrypted value. Later, the receiver's version of the algorithm uses its pad to decrypt the encrypted message by similarly indexing through the transformations for each encrypted character. A given portion of the pad's data set is designed to be used only for one specific message and then discarded. Assuming sufficient randomness in the discrete transformation values presented in the pad, it is basically impossible to break such a system. However, this approach has disadvantages in that both the sender and receiver must have the same pad, which has a finite number of character transformations. When the pad's data set is exhausted, a new pad is needed. The physical transfer of the pad between the sender and receiver is also a potential security risk. This renders a one-time pad less desirable for continual communication between users, and typically restricts its use to highly secure environments and data, where the volume of data transferred may be somewhat limited and highly controlled.

Some current data-encryption algorithms employ the symmetric key system, in which each user possesses a secret multi-bit key of the same type. This key directly encodes and decodes the transferred data in essentially the same manner as an ancient cipher system. The drawback of such a system is that, if the key is compromised, then the data transferred can be readily decoded by an unauthorized person possessing the key. The transfer of the key between the sender and receiver, so that both possess it, is a point of possible compromise, as an unauthorized person can potentially intercept it. Moreover, with sufficient computing power, even a huge key (128-bit, for example), can be broken by an unauthorized person through brute force techniques—that is, simply cycling through all variations of the key using the underlying encryption algorithm until a readable data set is derived. Also, while large keys may offer increased security from such brute force attacks, they also increase decryption time for any sent and received data between authorized users due to the increased processing overhead needed to handle such large numerical transformations.

A popular approach employed by many commercially available encryption applications is the public-private key system, also termed an asymmetric key system. This approach is desirable over a symmetric or one-time pad approach in that it does not require a potentially insecure initial transfer of pad or key information between the sender and the recipient. Rather, the algorithm resident in each of the sender and the receiver computer generates a public and private key pair, typically consisting of strings of alphanumeric characters. Briefly described, the public key of the sender and receiver are shared with each other. Each private key is retained by the sender and the recipient, respectively. The sender's private key is combined by its algorithm with the receiver's public key to create a sending encryption key. The encrypted data is decrypted by the receiver using its algorithm and a key composed of a combination of the receiver's private key and the sender's public key. Various approaches to generating the actual keys are used, with the goal of enhancing security. The public-private key approach provides reasonable security in many situations, and allows for long term communication of data without need for parties to update security information. However, data encrypted using this approach is susceptible to various attacks, such as brute force key search algorithms. In addition, the transmission of the public key between parties is subject to insecurity if an unauthorized party intercepts the transmitted public keys and substitutes its own. While a trusted certificate authority can be employed to guarantee the validity of public keys, this service may not be available or convenient in a number of data communication situations.

As the power of general purpose computers continues to increase, the ease with which even large keys can be broken also continues to grow. Likewise, the growing epidemic of worldwide Internet hacking by nefarious individuals and groups renders critical the need for a more secure data encryption system. It is therefore desirable to provide a cryptograph data communication system and method that is readily installed and employed by general purpose computers/data-handling devices (i.e. PCs, Macs, cellular telephones, PDAs and other handheld devices) without modification to hardware or operating system parameters. This system and method should allow for relatively rapid encryption and decryption of a variety of data types (text, graphics, video, audio, etc.), and should generally combine the convenience and long-term usability of a public key system with the high security of a one-time pad system. The system and method should avoid the use of transmitted keys that can be intercepted or broken. The system should also allow for transmission of secure data between a number of recipients and selective decryptability of encrypted data by discrete subset of authorized recipients within a larger group of recipients.

SUMMARY OF THE INVENTION

This invention overcomes the disadvantages of the prior art by providing a system and method for cryptographic communication of data transferred between computing systems, clients or terminals. The system and method allows for the use of identical random number database structures located on the sending and receiving clients to encode and decode messages in a highly random manner based on encoded instructions on how to apply the database to encode and subsequently decode the underlying encoded message data, allowing for a keyless transfer of message data between the sender and the recipient in a manner that is highly secure. This keyless cryptographic communications system and method includes an instruction set that is complied and contains a unique string of characters common to both terminals and a randomly chosen encoding method and the original filename. A message-to-be-transferred M is enciphered to ciphertext at the encoding terminal by converting the message to numeric values and altering those values with values from first of the common and matching random databases using a randomly chosen method from a discrete set of methods. The new numeric values are converted back into characters based on the new numeric values and the instruction set is added to the beginning of the encoded message. The encoded message and instruction set (collectively EM) is then encoded by converting each character of EM to numeric values and altering those values with values from the second of the common and matching random databases using a randomly chosen method from a discrete set of methods. The new numeric values are converted back into characters. The encoded message EM is transmitted to the decoding terminal. The decoding terminal reads the first line of EM and tries all possible decoding methods for the second encode until the unique string of characters common to both terminals is revealed by removing the specified random values from the numeric values of each character in the first line of EM until a successful decode of the unique string of characters. The successful method is thereafter used to decode the full message data, removing the second layer of encoding. The decoding terminal uses the now-revealed instruction set information to decode the message by removing the proper random values from the numeric values of each character in the first encoded message EM. The new numeric values are converted back into characters, or other appropriate data and the original message M is revealed.

In an illustrative embodiment, a system and method for cryptographic communication of data between a sending client and a receiving client includes providing an encode/decode application residing on each of the sending client and the receiving client. Each application includes a database structure comprising a predetermined sequence of random number values. Message data is encoded on the sending client. This includes (a) converting the message data into a sequence of numerical values (CRNVs), (b) altering each of the CRNVs by respectively applying each of a plurality of selected random number values from the database structure according to a first selected method to generate encoded message data, (c) and constructing and appending a header to the encoded message data to define a message structure, the header including at least an instruction set identifying the first selected method. The encoded message structure is then transmitted so as to be received by the receiving client. The encoded message structure is received and decoded on the receiving client. This includes (a) converting the message structure into a sequence of CRNVs, (b) reading the header to determine the selected method and the selected starting point from the instruction set, (c) altering each of the CRNVs by respectively applying each of the plurality of selected random number values from the database structure according to the first selected method to generate decoded message data, and (d) providing a received version of the message data for access on the receiving client.

Illustratively, the encoding process can further comprise defining the encoded message structure (including header) as a sequence of CRNVs and altering each of the CRNVs of the encoded message structure by respectively applying each of a plurality of selected random number values from the database structure according to a second selected method to generate the encoded message structure. The decoding process thus includes, prior to reading the header, decoding the header to determine the second selected method. This information is used in initially altering each of the CRNVs by respectively applying each of the plurality of selected random number values from the database structure according to the second selected method to provide partially decoded message data prior to altering each of the CRNVs by respectively applying each of the plurality of selected random number values from the database structure according to the first selected method. This double decoding thereby generates decoded message data. In addition, the first method and the second method can comprise both a procedure for skipping through the sequence of random number values in the database structure and a starting point within the sequence of random number values.

BRIEF DESCRIPTION OF THE DRAWINGS

The invention description below refers to the accompanying drawings, of which.

DETAILED DESCRIPTION

Figure 1:
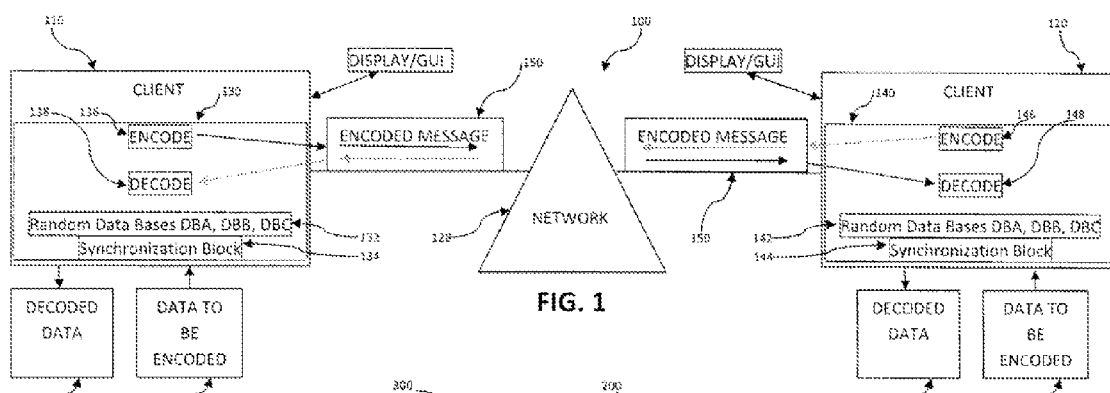
FIG. 1 is a schematic diagram of an operational environment for transmitting messages between an exemplary sender and receiver employing a cryptographic data communication system and method according to an illustrative embodiment.

FIG. 1 illustrates an overview of an exemplary arrangement 100 for implementing cryptographic (encryption and decryption) data communication system and method according to an illustrative embodiment. The arrangement 100 includes a pair of clients 110 and 120 that can each comprise a computing device capable of transmitting and receiving messages over a network 128, such as a LAN, WAN and/or the public Internet. More generally, any communication channel, including, but not limited to wired, wireless, optical or mixed-medium systems can be employed to interconnect the two clients. It is also expressly contemplated that a larger number of clients can be interconnected by one or more channels/networks, and thus the two-client arrangement of FIG. 1 is shown by way of a simplified example of the structure and function of the illustrative embodiment. Each client can be any type of computing device. In an illustrative embodiment, the clients are general purpose computers, such as PC-based systems or Apple Macs®. Alternatively, a client can be a portable device, such as a cellular telephone, music player (e.g. Apple iPod®), PDA, or any other device capable of performing messaging function and/or digital data transmission and/or reception, and any device capable of instantiating the cryptographic applications and associated databases to be described in software and/or hardware form.

In an illustrative embodiment, an encryption application 130, 140 is installed on each respective client 110, 120. As described below, the applications 130, 140 interoperate with the clients conventional operating system (Windows®, Linux®, Mac® OS, etc.) and networking functions. An associated set of unique and matching random number databases (each database block 132, 142 containing three individual databases DBA, DBB and DBC), employed by the applications to encode encrypted data and decode such data are provided, as well as associated synchronization blocks 134, 144 that are unique and common to both clients 110, 120. In an illustrative embodiment, random numbers in each of the three random number databases DBA, DBB, DBC are generated using any acceptable technique, such as those taking advantage of quantum effects. Each application 130, 140 includes such an encode process 136, 146, that functions to encode a data file 152, 162 (or another organization of data) on the client 110, 120 into an encoded message in a manner to be described below. The encoded message 150 is transferred from the sending client 110 or 120 over the network 128 using conventional protocols, such as TCP/IP, FTP or UDP. The encoded message 150 is received by the receiving client 120 or 110, and automatically or manually directed through the decode process 148, 138 to generate a decoded, readable/usable data file (or other data organization) 164, 154.

Figure 4:
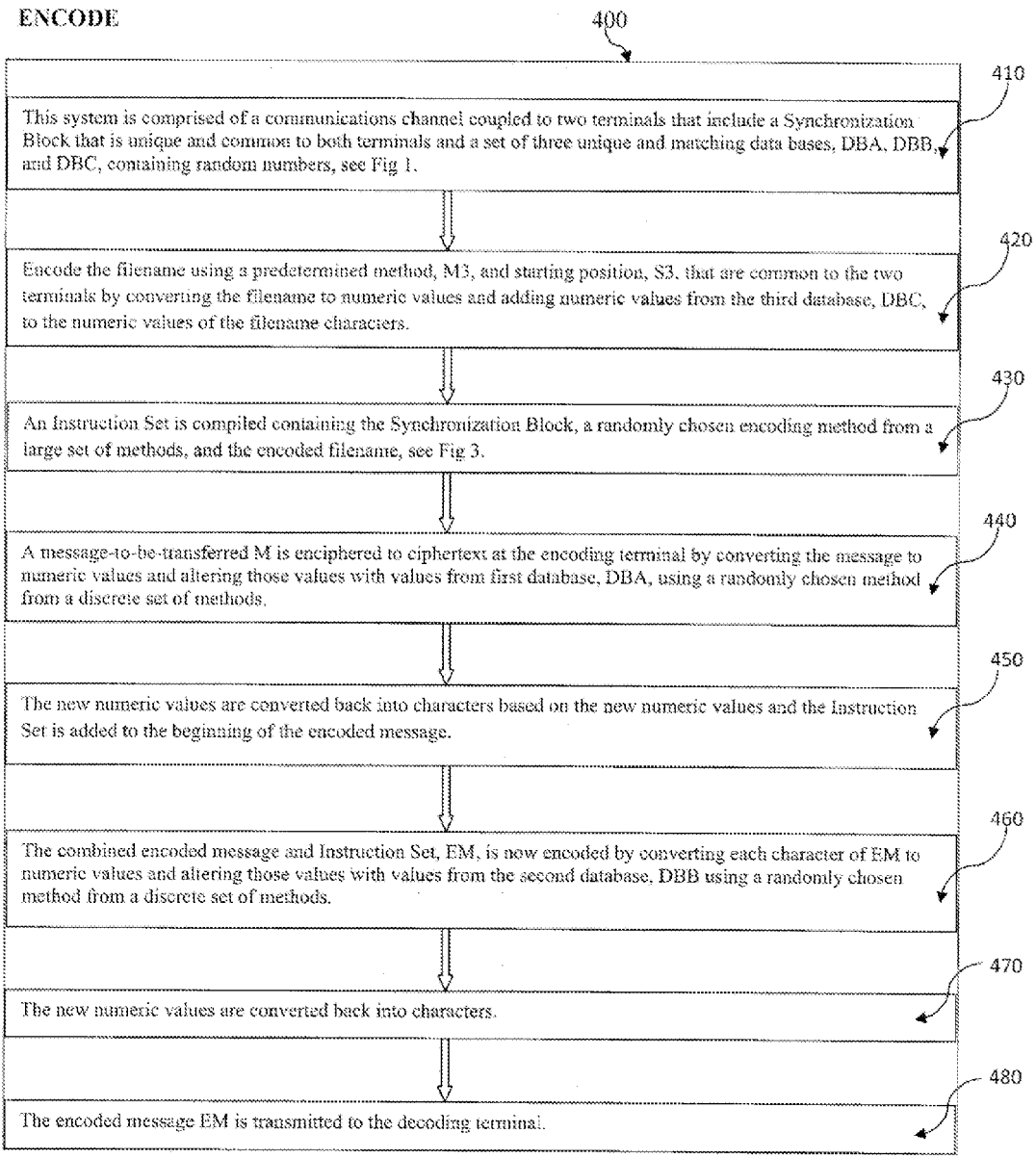
FIG. 4 is a flow diagram of an encoding procedure executed by the cryptographic data communication system and method of FIG. 1.

The operation of the Encode process 136, 146 and Decode process 138, 148 is now described in more detail with reference to the flow diagrams of FIGS. 4 and 5. Referring first to the encoding procedure 400 of FIG. 4, in step 410, the communication system between at least two clients is initially established and the application and associated data bases of random numbers DBA, DBB and DBC is provided to each client engaged in the cryptographic communication arrangement. The size of the databases DBA, DBB and DBC is highly variable. In general, they should contain sufficient numbers of values (for example, 8-bit values) to allow the various encoding methods to be employed (such methods including picking out random values in a selected sequence that tends to skip through the overall list), and allow enough values to encrypt every data point (character, for example) of a message of a given size. In an illustrative embodiment, each random number database includes approximately 100,000 to several million discrete random number values. This number is, of course highly variable and provided by way of example only. As noted, the values are the same on both communicating clients. These lists of random values are embodied in the application itself and not generally available for access or viewing by any party.

In step 420, the filename of the data file to be encoded is, itself encoded using one of a variety of available discrete encoding methods. Such methods can be referred to as M1, M2, M3, and are described by way of example further below. In general, the encoding consists of converting the filename characters to numeric values (for example 8-bit ASCII code values). The encoding illustratively entails adding (or otherwise mathematically modifying) numeric values from the third database DBC to the numeric values of the filename. In an embodiment, the numeric values in the database can correspond with ASCII characters as well, however any numerical value is expressly contemplated. The resulting appended filename characters can be represented as new ASCII characters. The method M3 skips through the database DBC to retrieve each value to be appended to a discrete filename character. The skipping method can be implemented in a variety of ways. For example, every other character can be skipped, a skip that doubles the distance for each character relative to the previous character's skip can be used, and/or complex mathematical functions to govern skip can be employed. The skip through the database DBC begins at a known start point S1, S2, S3, etc., which is an offset of S values into the database sequence from the first value. Each client in the arrangement has an identical database and knowledge of the same methods and start points so that a filename encoded in a sending client (or "terminal") can be decoded using the same database, start point and method in the receiving client (or "terminal").

Figure 3:
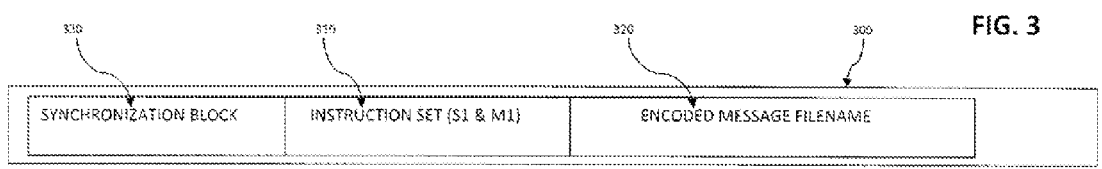
FIG. 3 is a block diagram of an encoded message header including a synchronization block, instruction set and filename for use with the cryptographic data communication system and method of FIG. 1.

Next, in step 430, and also with reference to an exemplary instruction set 310 in FIG. 3, the system compiles this structure as a message multi-part header 300. The message header 300 includes (a) the instruction set, consisting of information on the randomly chosen encoding method (M1 in this example) and starting point (S1 in this example) 310 for use in progressing (skipping) through the first database DBA; (b) the encoded filename 320 from step 420; and (c) a leading set of random characters known as the synchronization block 330.

Figure 2:
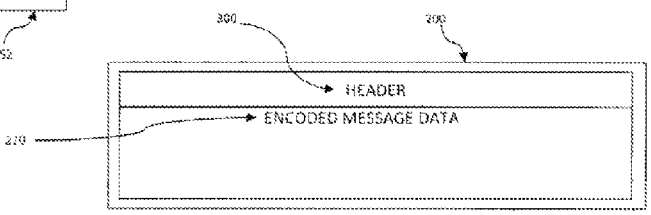
FIG. 2 is a block diagram of the first encoded message structure for transmission in accordance with the cryptographic data communication system and method of FIG. 1 including message data and message header.

Next, in step 440 the underlying message within the file (or other organization) to be encoded is enciphered to a ciphertext (encrypted data) by the application by converting the message to numeric values (for example, ASCII values) and appending values from the first database DBA using a randomly chosen method (M1, M2, M3, etc.) and starting point (S1, S2, S3, etc.). As shown in FIG. 2, the header 300 constructed in step 440 is then appended to the head of the of the encoded message data 210 to define the encoded message structure 200. This structure is the first message in a transmission. Subsequent portions of a given message file can be transmitted with a different header and decoded in accordance with the instruction set 310 of the first message in the transmission. Alternatively, discrete instruction sets can be provided to different portions of the same overall message file, in which case the structure 200 is repeated for each discrete chunk of the file. Step 450 can be considered a "first encoding" of the message. For further security the entire message structure now undergoes a "second encoding."

In step 460, the second encoding consists of encoding the entire message structure EM (200), including the encoded message data 210 and the instruction set 310. Illustratively, the encoded message EM is converted to numeric values (ASCII, for example), and a randomly chosen method (M1, M2, M3, etc.) and start point (S1, S2, S3, etc.) is employed to append numeric values to each value of EM so as to provide a second level of encoding. Then, in step 470 the new, second encoded, values are converted back into appropriate characters for transmission as a message EF. Such transmission of the encoded message (150 in FIG. 1) occurs using the sending client's standard network communication protocols or any other data communication process in step 480.

Figure 5:
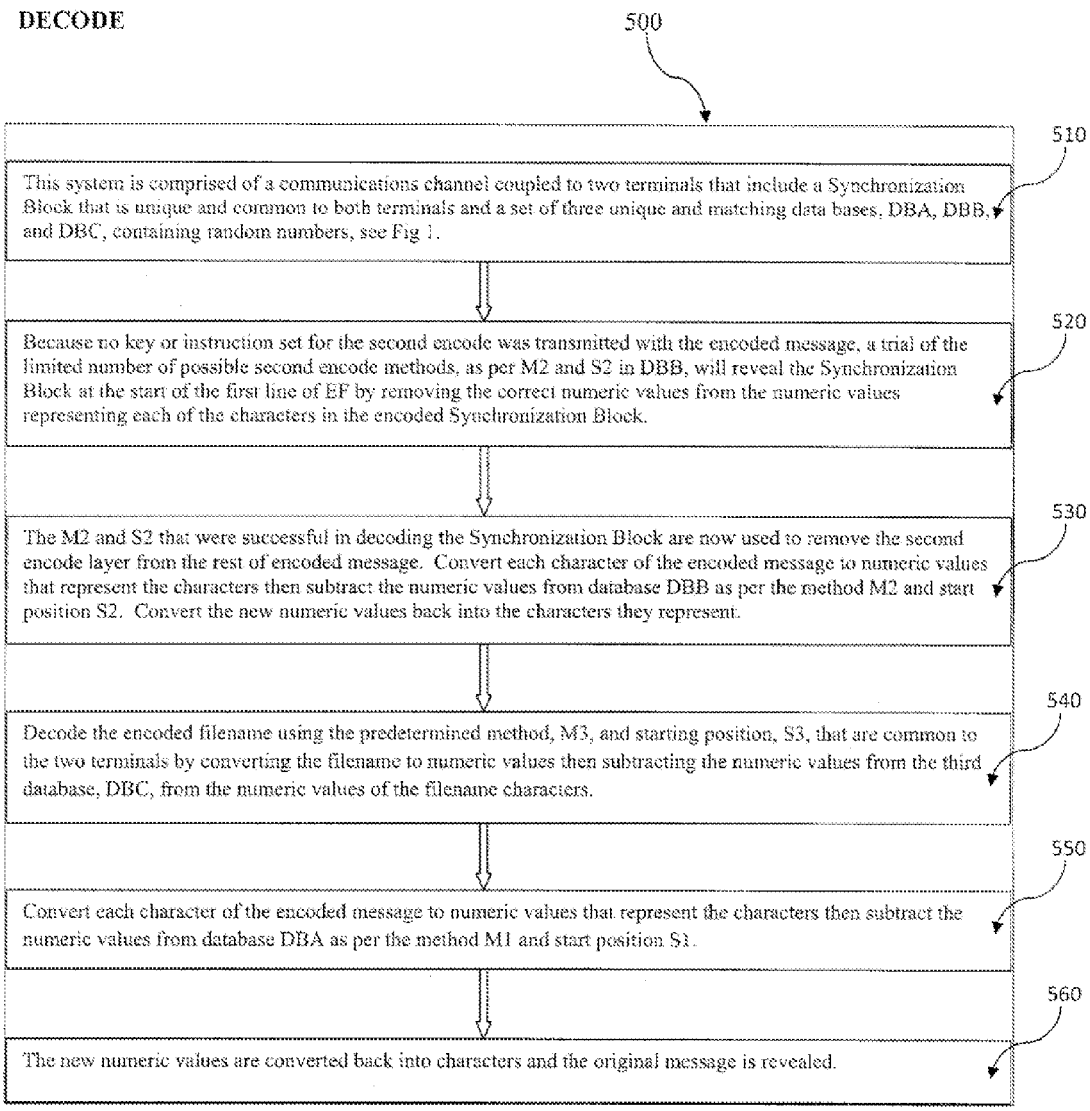
FIG. 5 is a flow diagram of a decoding procedure executed by the cryptographic data communication system and method of FIG. 1.

When an encoded message (150) (EF) is received, it is decoded by the receiving client (terminal) using the procedure 500 of FIG. 5. As in step 410 described above, in step 510, the communication system between at least two clients has been established and the application and associated data bases of random numbers DBA, DBB and DBC is provided to each client engaged in the cryptographic communication arrangement. Since the message was subjected to a second encode step (460) without appending any transmitted key or instruction set, the decoding procedure has no information on which method or starting point to employ in decoding the second-encode characters. The decode process knows only that one of a finite number of methods and starting points was used to produce the second encode EF. Accordingly, in step 520, the decode procedure 500 undertakes to decode at least a portion of the message (for example the header portion that should contain the instruction set 310) using a trial of various second decode methods and starting points in association with the database DBB. In general, decoding entails subtracting the numerical database values (or otherwise mathematically reversing the encoding process) from the characters of the message after converting the second encode characters into numerical values. This is essentially a "brute force" approach where the system continues to cycle through methods and starting points until it finds the predetermined synchronization block at the first line of the message EF. Thus, the entire need not be decoded in step 520, but only the portion that constitutes the header section. This substantially speeds the decoding time of the second decode process and reveals the second encode method and starting point (for example M2 and S2 of DBB).

In step 530, having derived the method and starting point of the second encode EF from the decoding of the synchronization block, the procedure 500 then employs the derived method and starting point (for example M2, S2) to decode the remainder of the message. This entails the conversion of the remaining message characters from the second encode into numeric values and mathematically subtracting or otherwise reversing the values using values from the database selected via the method and starting point. The derived values can now be converted back into characters, representing the first encoded message 210 (EM) and instruction set 310.

In step 540 the encoded filename 320 is read from the decoded header 300, and decoded a second time from the instruction set 310 using the predetermined method and starting point (in this case M3 and S3) that are common to the two clients 110, 120. As described above, the filename is converted to numeric values and then the numeric values taken from the database DBC are retrieved according to the method and starting point, and subtracted (or otherwise applied) from the filename numeric characters. The new numeric values can then be converted back to text characters (ASCII) for example, and stored as the decoded message filename.

Next in step 550, the characters of the encoded message 210 are subjected to a first decode procedure using information from the decoded instruction set relative to the method and start point in database DBA (in this example, M1 and S1). As before, the decoding consists of converting the characters of the message into numerical values, subtracting the numerical values from the database DBA in accordance to the skipping sequence of the method M1 and the start point S1. Finally, the numeric values of the decoded message data are converted back into characters. The decoded message characters are stored in a data file in association with the decoded filename from step 540, and the message can be accessed and read (or otherwise utilized) in a conventional manner via an appropriate application (for example, a PDF viewer, Word processing program, spreadsheet, video player, audio/music player, etc.).

It should be noted that the generation of a set of decoded characters, as well as the generation of encoded characters is illustrative only. As used herein the term "characters" can be taken broadly to include, not only text message data, but any division of a data stream into discrete numeric (binary for example) data segments of predetermined size that are generally part of a continuous stream of data. This stream defines the "message data." By way of example, a stream of binary data comprising an image or audio file can be divided into continuous 8-bit segments that thereby define "characters" to be encoded with the numeric data from the databases. The decoding of the message characters in the receiving client returns the data to a binary stream that allows for the use of the stream in the associated, exemplary image or audio application. In any encoding or decoding procedure contemplated herein, the division of the message data into characters typically requires that each character be decoded in the exact sequence that it was encoded with no loss of data. Clearly, any hiccups in the data transmission between the sending client and receiving client that cause a loss of one or more bits can in transmission disrupt the entire decoding process and render the message undecodable. The use of reliable networking protocols, such as TCP/IP can reduce the possibility of such data loss.

Figure 6:
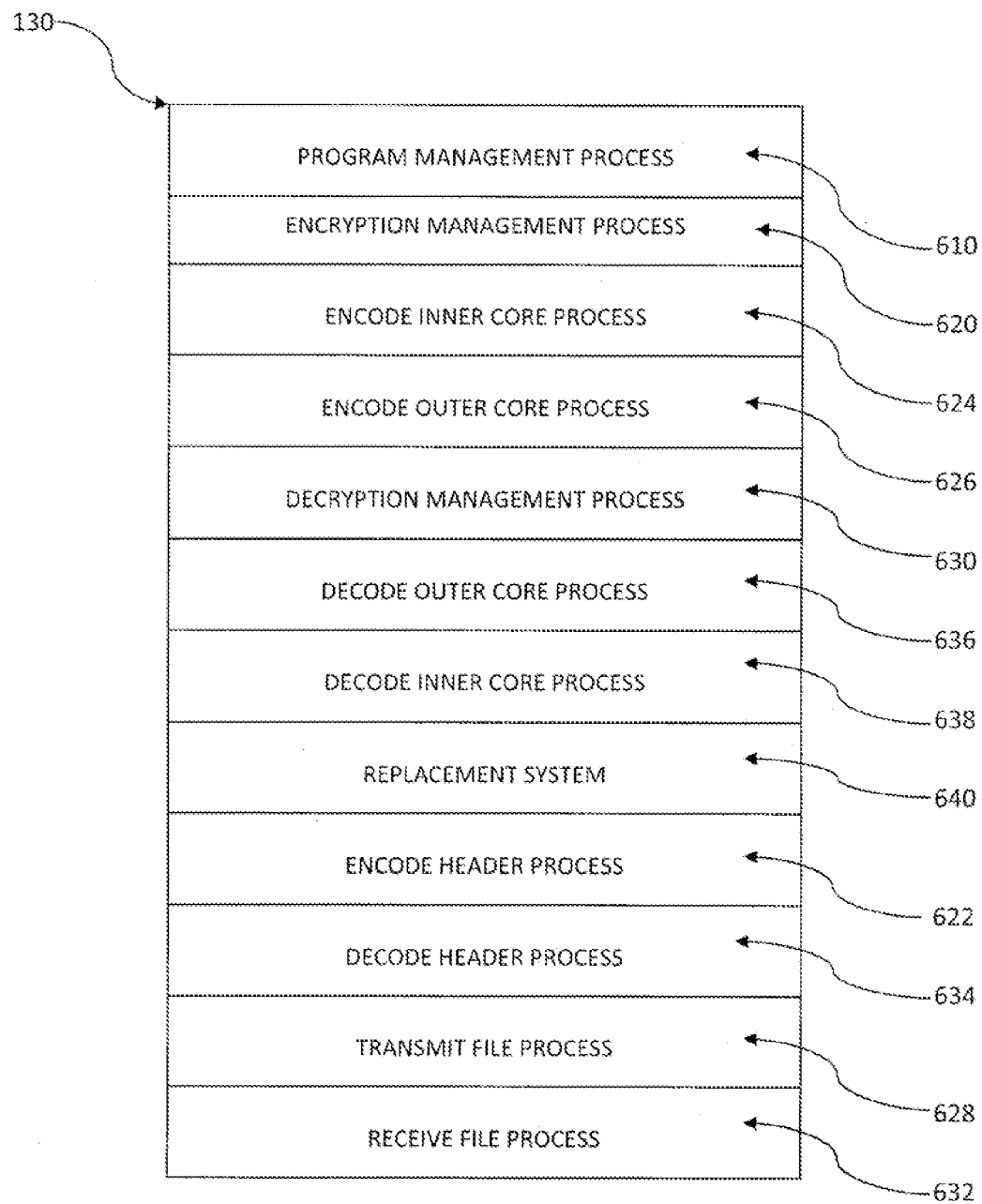
FIG. 6 is a block diagram of an illustrative organization for an application resident on each client for performing the cryptographic data communication system and method of FIG. 1.

With reference to FIG. 6, the organization of an illustrative embodiment of the cryptography (encode/decode) application 130 (and 140). The application includes a plurality of modules, functional blocks or processes. The program management process 610 oversees the operation of the encode process and decode process. Program management 610 idles, awaiting task requests from the user or an application seeking to encode or decode (for example an e-mail system or the operating system), and communicates with the user interface or automated decoding process resident on the client and directs whether a message undergoes encoding or decoding. The program management process determines whether to call the encryption management process 620 or the decryption management process 630 based on the requested task.

In the case of an encode task request the encryption management process 620 includes functions that (a) get input file to encode and send to recipient; (b) generate the instruction set; (c) construct the message header based upon the synchronization block, the instruction set and the filename; (d) call the encode header process 622; and (e) call the encode inner core process 624.

The encode header process 622 alters all numeric representations of characters (CRNVs) of the filename as specified by the predetermined method and returns to the encryption management process 620. The encode inner core process 624 converts any characters from the input file to CRNVs. Any characters that require handling cause the replacement system 640 to be called. The replacement system 640 changes the characters to the predetermined alternate representation (such as ASCII numeric values) CRNVs. The replacement system then returns to the encode inner core process 624. The encode inner core process 624 alters the CRNVs received from the replacement system 640 in a manner specified by the instruction set (in accordance with the database values, method and start point) generating a first encrypted file. The encode inner core process 624 adds the header to the encrypted file and calls the encode outer core process 626.

The encode outer core process 626 alters all CRNVs in the header-appended encrypted message using the instruction set information and database values. When complete, the encode outer core process 626 calls the transmit file process 628, which transmits the (double) encoded file using a predetermined communication channel and associated communication applications resident on the sending client to a predetermined recipient. The transmit file process 628 returns to the encode outer core process 626, which in turn, returns to program management process 610, the application having completed its encoding and message-transmission task. Program management 610 awaits a new encode or decode task thereafter.

In the case of a decode task, the program management process 610 calls the decryption management process 630. This process calls the receive file process 632 that saves the (double) encoded file received from a predetermined communication channel and/or network and returns to the decryption management process 630. The decryption management process 630 calls the decode header process 634, which initially uses trial and error (brute force) decoding methods and starting points to decode the synchronization block in the message header. When decoded, the synchronization block is used by the decode header process 634 to decode the method and start point needed to decode the remaining header, including the filename and the instruction set. The CRNVs in the filename (in the decoded header instruction set) are altered to provide the filename, which is stored in association with a file on the receiving client, after which the decode header process 634 returns to the decryption management process 630. The decryption management process 630 calls the decode outer core process 636, which alters all CRNVs in the message data as specified by the start position and method from the synchronization block decode in step 634. This process removes the header from the overall file, alters the CRNVs, as specified by the instruction set, and saves the resulting decoded file. When decode and save is complete the decode inner core process returns to decryption management 630 Decryption management 630, likewise, returns to program management to await the next task, having completed the present decoding task.

It should be clear that the organizational structure of the processes, functional blocks and/or program modules of the application 130, 140 is/are highly variable. Tasks can be organized into differing blocks as appropriate, and fewer or greater discrete blocks can be provided in alternate embodiments. Likewise, additional blocks, such as APIs can be provided to, for example, interface with specific programs or applications, such as an e-mail or networking application.

Having described the general procedures and organization of a cryptographic system, and method, the following is a runtime example to assist the reader's understanding of an illustrative embodiment. This example employs the above-described exemplary methods M1, M2, and M3, and associated database starting points S1, S2 and S3

Encode

As described above, the system and method is comprised of a communications channel coupled to two terminals that include a Synchronization Block that is unique and common to both terminals and a set of three unique and matching data bases, DBA, DBB, and DBC, containing random numbers, as shown generally in FIG. 1.

The message to be encoded, SF, is accessed:

A Header containing the Instruction Set is compiled containing the Synchronization Block, a randomly chosen encoding method from a large set of methods, and the original filename, as shown in FIG. 3.

The Synchronization Block is composed of a series of randomly selected characters: e.g. p8∈RJ[TÅÄÆ

The encoding method is composed of a randomly selected start position in the first random value data base DBA, S1, and the way in which to progress though the database, M1: i.e. 29360/9 (starting at position 29360 in DBA, move forward by 9 steps at a time for each message character being altered.)

Acquire Filename: Test.txt

Encode the filename using a predetermined method, M3, and starting position, S3, that are common to the two terminals by converting the filename to numeric values and adding numeric values from the third database (which are shown below by way of example of any possible random number array), DBC, to the numeric values of the filename characters:

Numeric Value of T=084+Offset 039=123-->{
Numeric Value of e=101+Offset 024=125-->}
Numeric Value of s=115+Offset 015=130-->,
Numeric Value of t=116+Offset 046=162-->¢
Numeric Value of .=046+Offset 041=087-->W
Numeric Value of t=116+Offset 009=125-->}
Numeric Value of x=120+Offset 002=122-->z
Numeric Value of t=116+Offset 034=150-->–
Encoded filename { },¢W} z–

The Instruction Set now looks like this: p8∈RJ[TÅÄÆ 29360/9/{ },═W}z

The message-to-be-transferred is enciphered to ciphertext at the encoding terminal in several steps:

Read in source file message data.

First Encode—Convert message data to numeric values and add numeric values from database DBA as per the method M1 and start position S1 chosen:

Example message to encode: This is a test
Numeric Value of T=084+Offset 039=123-->{
Numeric Value of h=104+Offset 024=128-->∈
Numeric Value of i=105+Offset 015=120-->x
Numeric Value of s=115+Offset 046=161-->¡
Numeric Value of  =032+Offset 041=073-->I
Numeric Value of i=105+Offset 009=114-->r
Numeric Value of s=115+Offset 002=117-->u
Numeric Value of  =032+Offset 034=066-->B
Numeric Value of a=097+Offset 045=142-->Ž
Numeric Value of  =032+Offset 020=052-->4
Numeric Value of t=116+Offset 034=150-->–
Numeric Value of e=101+Offset 039=140-->Œ
Numeric Value of s=115+Offset 006=121-->y
Numeric Value of t=116+Offset 049=165-->¥
Encoded message characters {∈x¡ IruBŽ4–Œ y ¥

Add the Instruction Set as the first line of the encoded message, (see generally FIG. 2). The encoded message will now appear in the following form:

p8∈RJ[TÅÄÆ 29360/9/{ },═W}z–
{∈x¡ IruBŽ4–Œ y ¥

This concludes the first encode.

Second Encode—Begin with a new randomly selected method, M2 and start position, S2, using the second data base, DBB. Note: the second encode method and start position selected are discarded after second encode is completed.

Convert the encoded message data to numeric values and add numeric values from database DBB as per the method M2 and start position S2:

Encoded message to second encode:
p8∈RJ[TÅÄÆ 29360/9/{ },¢W}z–
{∈x¡ IruBŽ4–Œ ¥
Numeric Value of p=112+Offset 012=124-->|
Numeric Value of 8=056+Offset 001=057-->9
Numeric Value of ∈=128+Offset 008=136-->ˆ
Numeric Value of R=082+Offset 026=108-->l Numeric Value of J=074+Offset 004=078-->N
Numeric Value of [=091+Offset 010=101-->e
Numeric Value of T=084+Offset 023=107-->k
Numeric Value of Å=197+Offset 003=200-->È
Numeric Value of Æ =198+Offset 025=223-->β
Numeric Value of 2=050+Offset 016=066-->B
Numeric Value of 9=057+Offset 021=078-->N
Numeric Value of 3=051+Offset 025=076-->L
Numeric Value of 6=054+Offset 033=087-->W
Numeric Value of 0=048+Offset 022=070-->F
Numeric Value of /=047+Offset 036=083-->S
Numeric Value of 9=057+Offset 010=067-->C
Numeric Value of /=047+Offset 050=097-->a
Numeric Value of {=123+Offset 014=137-->‰
Numeric Value of }=125+Offset 045=170-->ª
Numeric Value of ,=130+Offset 025=155-->›
Numeric Value of ¢=162+Offset 001=163-->£
Numeric Value of W=087+Offset 005=092-->\
Numeric Value of }=125+Offset 040=165-->¥
Numeric Value of z=122+Offset 002=124-->|
Numeric Value of –=150+Offset 041=191-->¿
Numeric Value of {=123+Offset 016=139-->‹
Numeric Value of €=128+Offset 017=145-->'
Numeric Value of x=120+Offset 046=166-->¦
Numeric Value of ¡ =161+Offset 011=172-->¬
Numeric Value of I=073+Offset 038=111-->o
Numeric Value of r=114+Offset 036=150-->–
Numeric Value of u=117+Offset 021=138-->Š
Numeric Value of B=066+Offset 045=111-->o
Numeric Value of Ž=142+Offset 023=165-->¥
Numeric Value of 4=052+Offset 050=102-->f
Numeric Value of –=150+Offset 002=152-->
Numeric Value of Œ =140+Offset 010=150-->–
Numeric Value of y=121+Offset 003=124-->|
Numeric Value of ¥=165+Offset 012=177-->±
Second encoded message is now represented as follows:

|9ˆlNekÈβtBNLWFSCa‰ª› £\¥|¿ <'¦‹ o–ŠoÂ¥f–|±

This concludes the second encode.

Save second encoded message as EF.

Send encoded message EF

Decode

The decode process will be accomplished by reversing the encode process on the received, encoded message.

First Decode—Read in the first line of encoded message, EF

|9ˆlNekÈβBNLWFSCa‰ª>£\¥|¿

Because no key or instruction set for the second encode was transmitted with the encoded message, a trial of the limited number of possible second encode methods, as per M2 and S2 in DBB, will reveal the Synchronization Block at the start of the first line of EF by removing the correct numeric values from the numeric values representing each of the characters in the encoded Synchronization Block.

For example, with the correct M2 and S2: convert each character of the encoded Synchronization Block to numeric values that represent the characters and subtract the numeric values from database DBB as per the method M2 and start position S2:

Encoded Synchronization Block |9ˆlNekÈβ
Numeric Value of |=124–Offset 012=112-->p
Numeric Value of 9=057–Offset 001=056-->8
Numeric Value of ˆ=136–Offset 008=128-->€
Numeric Value of l=108–Offset 026=082-->R
Numeric Value of N=078–Offset 004=074-->J
Numeric Value of e=101–Offset 010=091-->[
Numeric Value of k=107–Offset 023=084-->T
Numeric Value of È=200–Offset 003=197-->Å
Numeric Value of β=223–Offset 025=198-->Æ
Decoded Synchronization Block p8€RJ[TÅÆ

Second Decode—The M2 and S2 that were successful in decoding the Synchronization Block are now used to remove the second encode layer from the rest of encoded message:

Convert each character of the encoded message to numeric values that represent the characters then subtract the numeric values from database DBB as per the method M2 and start position S2:

Numeric Value of B=066–Offset 016=050-->2
Numeric Value of N=078–Offset 021=057-->9
Numeric Value of L=076–Offset 025=051-->3
Numeric Value of W=087–Offset 033=054-->6
Numeric Value of F=070–Offset 022=048-->0
Numeric Value of S=083–Offset 036=047-->/
Numeric Value of C=067–Offset 010=057-->9
Numeric Value of a=097–Offset 050=047-->/
Numeric Value of ‰=137–Offset 014=123-->{
Numeric Value of ª=170–Offset 045=125-->}
Numeric Value of › =155–Offset 025=130-->,
Numeric Value of £=163–Offset 001=162-->¢
Numeric Value of \=092–Offset 005=087-->W
Numeric Value of ¥=165–Offset 040=125-->}
Numeric Value of |=124–Offset 002=122-->z
Numeric Value of ¿ =191–Offset 041=150-->–
Numeric Value of ‹ =139–Offset 016=123-->{
Numeric Value of '=145–Offset 017=128-->€
Numeric Value of ¦=166–Offset 046=120-->x
Numeric Value of ¬ =172–Offset 011=161-->¡
Numeric Value of o=111–Offset 038=073-->I
Numeric Value of –=150–Offset 036=114-->r
Numeric Value of Š=138–Offset 021=117-->u
Numeric Value of o=111–Offset 045=066-->B
Numeric Value of ¥=165–Offset 023=142-->Ž
Numeric Value of f=102–Offset 050=052-->4
Numeric Value of =152–Offset 002=150-->–
Numeric Value of –=150–Offset 010=140-->Œ
Numeric Value of |=124–Offset 003=121-->y
Numeric Value of ±=177–Offset 012=165-->¥

Convert the new numeric values back into the characters they represent.

The encoded message is now represented as follows:

29360/9/{ },¢W}z–
{€x¡ IruB4–Œ ¥

As shown above, the instruction set (29360/9) is now revealed and the values are saved as S1 and M1 for later use.

Decode the encoded part of the Instruction Set that represents the filename

{ },¢W}z–

Decode the encoded filename using the predetermined method, M3, and starting position, S3, that are common to the two terminals by converting the filename to numeric values then subtracting the numeric values from the third database, DBC, from the numeric values of the filename characters:

Numeric Value of {=123–Offset 039=084-->T
Numeric Value of }=125–Offset 024=101-->e
Numeric Value of ,=130–Offset 015=115-->s
Numeric Value of ¢=162–Offset 046=116-->t
Numeric Value of W=087–Offset 041=046-->.
Numeric Value of }=125–Offset 009=116-->t
Numeric Value of z=122–Offset 002=120-->x
Numeric Value of –=150–Offset 034=116-->t
Filename Test.txt This concludes the second decode.

First Decode—Delete the first line (Header with Instruction) from encoded message.

The encoded message is now represented as follows:
{€x¡ IruBŽ4-Œ y¥

Convert each character of the encoded message to numeric values that represent the characters then subtract the numeric values from database DBA as per the method M1 and start position S1:

Numeric Value of {=123–Offset 039=084-->T
Numeric Value of €=128–Offset 024=104-->h
Numeric Value of x=120–Offset 015=105-->i
Numeric Value of ¡=161–Offset 046=115-->s
Numeric Value of I=073–Offset 041=032-->
Numeric Value of r=114–Offset 009=105-->i
Numeric Value of u=117–Offset 002=115-->s
Numeric Value of B=066–Offset 034=032-->
Numeric Value of Ž=142–Offset 045=097-->a
Numeric Value of 4=052–Offset 020=032-->
Numeric Value of -=150–Offset 034=116-->t
Numeric Value of Œ=140–Offset 039=101-->e
Numeric Value of y=121–Offset 006=115-->s
Numeric Value of ¥=165–Offset 049=116-->t Convert the new numeric values back into the characters they represent to reveal the following fully decoded message:
This is a test Save as the fully decoded message using the original filename:
test.txt It should be clear that the above-described system and method for cryptographic communication can provide substantial security to a prearranged set of clients communicating over a network. This arrangement does not require the transmission of keys between parties. The random nature of the alteration of each character or data segment in the data stream of the message (as well as the header) ensures that breakage of the encrypted message by an unauthorized party is essentially impossible.

The foregoing has been a detailed description of illustrative embodiments of the invention. Various modifications and additions can be made without departing from the spirit and scope of this invention. Each of the various embodiments described above may be combined with other described embodiments in order to provide multiple features. Furthermore, while the foregoing describes a number of separate embodiments of the apparatus and method of the present invention, what has been described herein is merely illustrative of the application of the principles of the present invention. For example, it is expressly contemplated that the header can include information that restricts the particular clients having access to the data and that unauthorized recipients, while having the application resident on the client as part of a larger group, are incapable of opening a particular message. Additionally, it is contemplated that the application can include a variety of graphical user interface functions, and can be a standalone application, integrated with another application, such as an e-mail application, or both. Additionally, the number of databases and their organization, as well as the size and organization of the synchronization block and other parts of the header, are highly variable. Also, while the term "header" is used herein, this term should be taken broadly to include a data structure performing one or more functions of the header described herein located at any identifiable location within the message data stream. Likewise, while the sending and receiving clients are shown as discrete devices, it is respectively contemplated that the sending and receiving clients can be portions of a single device, such as in a loop-back arrangement. In general, a sending site and a receiving site for an encoded message can be the same computer and/or application in an embodiment. For example, a message can be encoded by the encode process, transmitted within a single computer, device or system to a file and stored in its encoded form later decoding. The original unencrypted message can then be digitally shredded, allowing for secure storage of data. Moreover, while the term "method" and "starting point" refer generally to a manner of skipping through the random number database and the point in the database sequence to begin the skip, the term "method" can be defined more broadly to include at least one of the starting point, the mathematical rules for skipping through values in the sequence or both. Alternatively, a "method" can comprise only skipping from a constant point in the sequence (such as the first point) or only offsetting a constant skip from a predetermined non-origin (and variable) starting point. Accordingly, this description is meant to be taken only by way of example, and not to otherwise limit the scope of this invention.

What is claimed is:

1. A method for cryptographic communication of data between a sending client and a receiving client comprising:
   providing an encode/decode application residing on each of the sending client and the receiving client, each application including a database structure comprising a predetermined sequence of random number values;
   encoding message data on the sending client, including (a) converting the message data into chunks of numerical values (CRNVs), (b) altering each of the CRNVs by respectively applying each of a plurality of selected random number values from the database structure according to a first selected method to generate encoded message data, (c) and constructing and appending a header that identifies a selected starting point within the random number values to the encoded message data to define a message structure, the header including at least an instruction set identifying the first selected method;
   transmitting the encoded message structure so as to be received by the receiving client; and
   decoding the encoded message structure on the receiving client, including (a) converting the message structure into a sequence of CRNVs, (b) reading the header to determine the selected method and the selected starting point from the instruction set, (c) altering each of the CRNVs by respectively applying each of the plurality of selected random number values from the database structure according to the first selected method to generate decoded message data, and (d) providing a received version of the message data for access on the receiving client.

2. The method as set forth in claim 1 wherein the step of encoding further comprises defining the encoded message structure as a sequence of CRNVs and altering each of the CRNVs of the encoded message structure by respectively applying each of a plurality of selected random number values from the database structure according to a second selected method to generate the encoded message structure, and wherein the step of decoding includes, prior to the step of reading, decoding the header to determine the second selected method and altering each of the CRNVs by respectively applying each of the plurality of selected random number values from the database structure according to the second selected method to provide partially decoded message data prior to the step of (c) altering each of the CRNVs by respectively applying each of the plurality of selected random number values from the database structure according to the first selected method to generate decoded message data.

3. The method as set forth in claim 2 wherein the first method and the second method comprise both a procedure for skipping through the sequence of random number values in the database structure and a starting point within the sequence of random number values.

4. The method as set forth in claim 1 wherein the chunks define bytes.

5. The method as set forth in claim 4 wherein the bytes define ASCII characters.

6. A system for cryptographic communication operating according to the method in accordance with claim 1.

7. The system as set forth in claim 6 wherein the chunks define bytes.

8. A non-transitory computer readable medium for cryptographic communication of data over a network between a sending client and a receiving client comprising:

an encode/decode application residing on each of the sending client and the receiving client, each application including a database structure comprising a predetermined sequence of random number values;

means for encoding message data on the sending client, including means for (a) converting the message data into chunks of numerical values (CRNVs), (b) altering each of the CRNVs by respectively applying each of a plurality of selected random number values from the database structure according to a first selected method to generate encoded message data, (c) and constructing and appending a header that identifies a selected starting point within the random number values to the encoded message data to define a message structure, the header including at least an instruction set identifying the first selected method;

means for transmitting the encoded message structure so as to be received by the receiving client; and means for decoding the encoded message structure on the receiving client, including means for (a) converting the message structure into a sequence of CRNVs, (b) reading the header to determine the selected method and the selected starting point from the instruction set, (c) altering each of the CRNVs by respectively applying each of the plurality of selected random number values from the database structure according to the first selected method to generate decoded message data, and (d) providing a received version of the message data for access on the receiving client.

9. The non-transitory computer-readable medium as set forth in claim 8 wherein the chunks define bytes.

10. The non-transitory computer-readable medium as set forth in claim 9 wherein the bytes define ASCII characters.

11. The system as set forth in claim 7 wherein the bytes define ASCII characters.

\* \* \* \* \*